(12) United States Patent
Bulusu et al.

(10) Patent No.: US 7,305,544 B2
(45) Date of Patent: Dec. 4, 2007

(54) INTERLEAVED BOOT BLOCK TO SUPPORT MULTIPLE PROCESSOR ARCHITECTURES AND METHOD OF USE

(75) Inventors: Mallik Bulusu, Olympia, WA (US); Vincent J. Zimmer, Federal Way, WA (US); Rahul Khanna, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 11/010,167

(22) Filed: Dec. 10, 2004

(65) Prior Publication Data

US 2006/0129795 A1 Jun. 15, 2006

(51) Int. Cl.
G06F 15/177 (2006.01)
G06F 9/24 (2006.01)

(52) U.S. Cl. .............................................. 713/2; 713/1
(58) Field of Classification Search ..................... 713/2
See application file for complete search history.

(56) References Cited

U.S. PATENT DOCUMENTS

| | | | |
|---|---|---|---|
| 5,694,600 A * | 12/1997 | Khenson et al. ................ | 713/2 |
| 5,704,035 A | 12/1997 | Shipman | |
| 5,844,986 A | 12/1998 | Davis | |
| 5,890,191 A * | 3/1999 | Espinor et al. ............. | 711/103 |
| 5,991,197 A | 11/1999 | Ogura et al. | |
| 6,003,130 A * | 12/1999 | Anderson ...................... | 713/2 |
| 6,009,495 A | 12/1999 | DeRoo et al. | |
| 6,031,757 A | 2/2000 | Chuang et al. | |
| 6,058,048 A | 5/2000 | Kwon | |
| 6,081,664 A | 6/2000 | Nowlin, Jr. | |
| 6,081,890 A | 6/2000 | Datta | |
| 6,154,819 A | 11/2000 | Larsen et al. | |
| 6,154,837 A | 11/2000 | Fudeyasu et al. | |
| 6,182,187 B1 | 1/2001 | Cox et al. | |
| 6,205,548 B1 | 3/2001 | Hasbun | |
| 6,272,629 B1 | 8/2001 | Stewart | |
| 6,367,074 B1 | 4/2002 | Bates et al. | |
| 6,381,693 B2 * | 4/2002 | Fish et al. ..................... | 713/1 |
| 6,463,535 B1 | 10/2002 | Drews | |

(Continued)

OTHER PUBLICATIONS

Intel Itanium Architecture Software Developer's Manual, Processor Abstraction Layer, Chapter 11 (2002).

(Continued)

Primary Examiner—Rehana Perveen
Assistant Examiner—Stefan Steynov
(74) Attorney, Agent, or Firm—Marshall, Gerstein & Borun LLP (57) ABSTRACT

A flash memory has an interleaved boot block compatible with multiple processor architectures. The interleaved boot block may include one boot block compatible with a first CPU architecture and another boot block compatible with a second CPU architecture. These two boot blocks may be combined in an interleaved manner in the flash memory so that during a boot process only one of the two boot blocks executes, although both are stored in the flash memory. By interleaving different boot blocks, a common socket computer system capable of supporting multiple processor architectures may be achieved without fully replacing an incompatible basic input/output system (BIOS). Further, the flash memory may contain an updatable portion in which any BIOS segments incompatible with a processor architecture may be updated via a recovery, or update, process.

34 Claims, 7 Drawing Sheets

U.S. PATENT DOCUMENTS 6,633,964 B2 10/2003 Zimmer et al.
2004/0210750 A1* 10/2004 Chheda et al. ................. 713/1

OTHER PUBLICATIONS

Extensible Firmware Interface Specification, EFI Byte Virtual Machine, Chapter 19 (2002).

IA-32 Intel Architecture Software Developer's Manual, Multiple-Processor Management, Chapter 7 (2004).

Intel 82802AB/82802AC Firmware Hub (FWH) Datasheet—May (2000).

* cited by examiner

INTERLEAVED BOOT BLOCK TO SUPPORT MULTIPLE PROCESSOR ARCHITECTURES AND METHOD OF USE

FIELD OF THE INVENTION

The invention relates generally to boot block execution on computer systems and more particularly to methods and apparatus for interleaving boot blocks to facilitate common socket computer platforms

BACKGROUND OF RELATED ART

In the computer hardware industries, microprocessor development and advancement has presented customers with a number of processor architectures and computer systems to choose from. The options available to a customer have grown to allow customers to choose computer systems that have processors better designed to meet their specific needs, from the personal home computer to the network server. And recently to offer customers even further choices, hardware manufacturers have proposed common board computer systems operable across numerous processor architectures. With a modular processor design, a customer could be able to purchase one computer and swap out different processor architectures without needing to replace the entire system, the processor board, or processor chipsets. There are limitations effecting the implementation of such common board systems.

Different processor architectures operate under different protocols, for example, executing instructions of different, incapable word lengths, and in different, incapable ways. The Pentium® and Xeon™ Processor Family of microprocessors (available from Intel Corporation Santa Clara, Calif.) are 32 bit IA32 processors, while the Itanium® Processor Family (IPF) of microprocessors (also available from Intel Corporation) comprises 64 bit processors. And while common board, modular firmware has been proposed for swapping between these processors in a single computer system, such swap out is hindered by the vastly different boot procedures required for starting up a system under each environment.

The boot environment for each processor architecture requires execution of a different basic input/output system (BIOS) at system startup. BIOS is the essential system code or instructions used to control system configuration and to load the operating system for the computing system. BIOS provides the first instructions a computing system executes when it is first turned on. BIOS, which is stored in a flash memory, is executed each time the system is started and executes drivers required for the computer system prior to execution of the operating system abstraction.

Processor architecture may have a different flash memory map for its BIOS. The flash maps for an IA32 BIOS are different from that of an IPF BIOS, for example. Since the flash update procedures rely on flash maps which describe the flash consumption, BIOS updates across processor architectures not available for the common board/socket/module systems. In other words, while common board designs may allow swap out of the microprocessor, one processor architecture BIOS may not be swapped out for another. Furthermore, the topmost flash portions of the book block code for the BIOS may be protected and may not be updated, or changed, to another processor architecture BIOS. In short, while common board systems offer the modularity of microprocessors, they do not offer modularity of the BIOS required specific to these microprocessors. Common board/socket/module system architectures would, therefore, benefit from an ability to efficiently move from one BIOS to another, whenever the system microprocessor is changed.

BRIEF DESCRIPTION OF THE DRAWINGS

Illustrations are provided by way of example and not limitation in the accompanying figures, in which.

DETAILED DESCRIPTION OF AN EXAMPLE

Various techniques are described for a flash memory storing boot processes that are compatible with different processor architectures. In some examples, the flash memory may include an interleaved boot block that supports different processor architectures, thus allowing a single computer system to boot up with different CPUs. Various example implementations are now described. However, it will be appreciated that the techniques are not limited to these implementations, as these examples are provided for explanation purposes.

Figure 1:
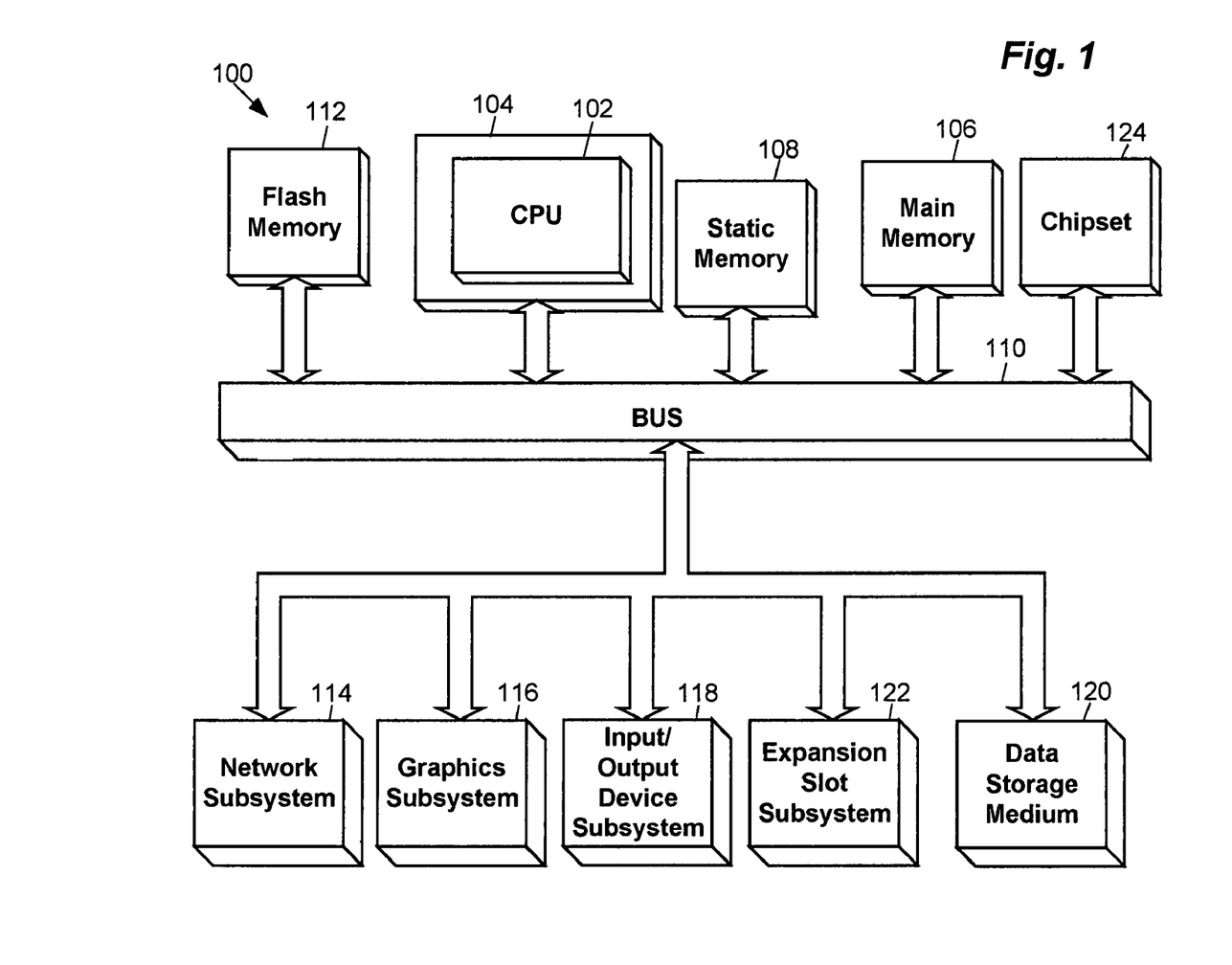
FIG. 1 illustrates an example computer system within which an interleaved boot block may be implemented.

The techniques may be implemented on processor-based systems such as the example system 100 shown in FIG. 1, which may be part of a computer system, i.e., a personal computer or server application. Alternatively, the system 100 may be a mobile device such as a laptop computer or a hand held device such as a personal data assistant (PDA), cellular telephone, or smart device.

The system 100 includes a CPU unit 102, which for example may have Level 1 and Level 2 caches coupled thereto or formed therewith. Sample caches include data cache, instruction cache, and execution cache. The CPU 102 may include a discrete arithmetic logic unit (ALU), registers, and control unit all connected together. Or, as shown, the CPU 102 may be an integrated microprocessor. The illustrated configuration is by way of example only, as the configuration may include additional, fewer, or other components.

In the illustrated example, the CPU 102 may represent any one of a number of microprocessors. Examples include Pentium® 4, Itanium®, Itanium® 2, Xeon™, Mobile Pentium® III-M, Pentium® M, PXA255, PXA262, and/or any XScale™-based processors (all available from Intel Corporation of Santa Clara, Calif.). This list is provided by way of example only. The CPU 102 may represent any of the PowerPC® line of microprocessors available from IBM Corporation of White Plains, N.Y., as well as other single or multiple microprocessor architectures. The CPU 102 may represent one of the UltraSPARC® family of processors available from Sun Microsystems, of Santa Clara, Calif. or one of the Opteron™ family of processors available from AMD of Sunnyvale, Calif. These processors are provided by way of example, not limitation.

In the illustrated example, the CPU 102 of system 100 may be interchanged from one CPU having a first processor architecture to another CPU having a second, different processor architecture. For example, the CPU 102 is shown connected to a CPU socket 104 that may be a common socket compatible with different CPUs of different architectures. For example, the common socket 104 may be capable of supporting both an IA32 processor architecture, such as that of the Pentium® 4 and Xeon™ processor families (available from Intel Corporation, Santa Clara, Calif.) and an Itanium® Processor Family (IPF) architecture, such as the Itanium® family of processors, including Itanium® and Itanium® 2 processors (available from Intel Corporation). Alternatively, the common socket 104 may represent multiple CPU sockets within the system 100.

The CPU 102 is coupled to a main memory 106, e.g., a volatile random access memory, and a static memory 108, e.g., a read-only memory (ROM), via a bus 110. The main memory 106 may store information and instructions (program code) that are executed by or used by the CPU 102. The static memory 108 may store information and instructions (program code) that are executed or used by the CPU 102, e.g., programmable firmware. The CPU 102 may also be coupled to a flash memory 112 that may be a ROM, such as an electrically erasable programmable read-only memory (EEPROM). FIG. 1 illustrates the flash memory 112 separately from the static memory 108, for explanation purposes, but the flash memory 112 may be portion of a static memory 108, for example if the static memory 108 is a computer system ROM.

The flash memory 112 may be a nonvolatile memory device that can be erased and reprogrammed in units of memory called blocks. The flash memory 112 stores BIOS code or instructions for the computing system 100. The BIOS stored in flash memory 112 may be formed of different blocks, for example a first boot block, a second boot block, a system BIOS block, and an additional firmware block. The boot blocks, and any additional blocks as desired, may be protected such that the BIOS code stored in those regions of the flash memory 112 cannot be changed or altered. For instance, code or instructions for system BIOS recovery may be stored in a protected manner in the boot block beyond the 64 Kbyte memory blocks of conventional flash memories. The flash memory 112 may store a first BIOS boot block compatible with a first processor architecture and a second BIOS boot block compatible with a second, different processor architecture. For example, the flash memory 112 may be compatible with any processor architecture, or architecture, of the CPU 102, so that if the CPU 102 is switched from one processor architecture to another, the flash 112 is able to present a BIOS boot block compatible with that new processor architecture, without updating the boot block portion of the flash memory 112.

In the illustrated example, the system 100 includes additional subsystems coupled to the CPU 102. By way of example, the system bus 110 is coupled to a network subsystem 114, such as a network controller, and a graphics subsystem 116, such as an Advanced Graphics Processor (AGP) compatible video card. An input/output device subsystem 118 and a data storage medium 120, e.g., a mass storage device or controller, are also both connected to the system bus 110. Also in the illustrated example, the bus 110 is coupled to an expansion slot subsystem 122, i.e., expansion slot device, which may represent a Peripheral Component Interconnect (PCI) interface adhering to a Specification Revision 2.1 developed by the PCI Special Interest Group of Portland, Oreg., or a derivative of this specification substantially compliant therewith. The subsystems 118, 120 and 122 may represent any interfaces, however, including an interface for a universal serial bus (USB), Specification 1.0a (USB Implementer's Forum, revision July 2003) or 2.0 (USB Implementer's Forum, originally released April 2000, errata May 2002), an IEEE 1394b standard interface (approved by the Institute of Electrical and Electronics Engineers IEEE in April 2002), or any derivative of these specifications substantially compliant therewith. These various subsystems and interfaces are provided by way of example, not limitation.

FIG. 1 also shows a chipset 124 coupled to the bus 110. The chipset may be a single- or multiple-unit device compatible with multiple processor architectures, so that the chipset 122 may be used with different CPUs, with or without update upon switching from one CPU to another.

Upon system turn on, the CPU 102 may execute a boot sequence using the BIOS boot block stored in the flash 112, which loads system/device drivers and initiates the execution of an operating system stored on a mass storage or other medium. The operating system may be any of a variety of systems, for example, one of the WINDOWS family of systems available from Microsoft Corporation of Redmond, Wash., such as WINDOWS 95, 98, 2000, ME, XP, CE, Pocket PC or Mobile. Alternatively, the operating system may be one of the UNIX* family of systems, originally developed by Bell Labs (now Lucent Technologies Inc./Bell Labs Innovations) of Murray Hill, N.J. and available from various sources. As a further alternative, the operating system may be an open-source system, such as the LINUX* operating system. It will be recognized that still further alternative operating systems may be used.

Figure 2A:
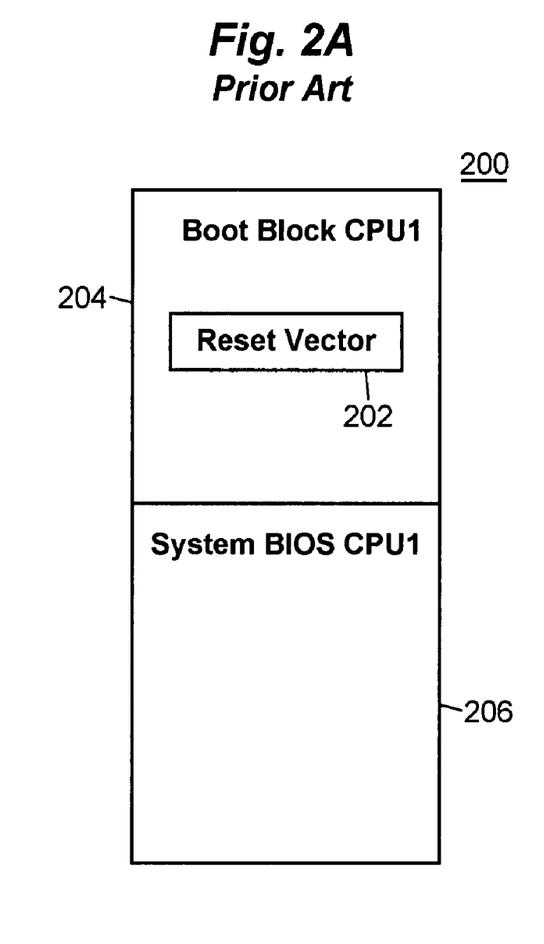
FIGS. 2A & 2B illustrate block diagrams of two conventional flash memories, respectively, one compatible with a first processor architecture and the other compatible with a second processor architecture.
Figure 2B:
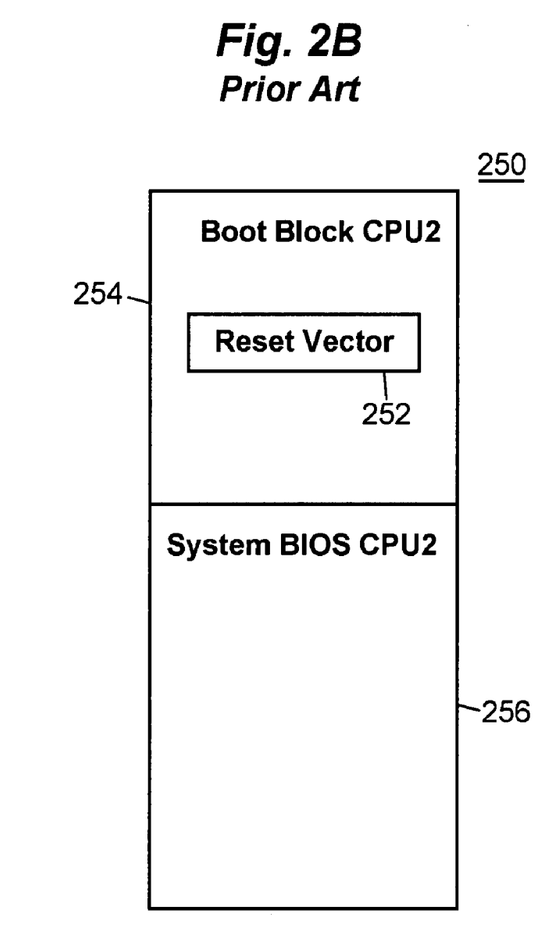

Conventional boot blocks as might be stored in a flash memory are illustrated in FIGS. 2A and 2B, respectively. The boot blocks may be considered recovery blocks as the code used to perform catastrophic recovery of BIOS is integrated therein. FIG. 2A illustrates a first flash memory 200 that includes a reset vector 202 stored at a first memory address of a boot block 204 compatible with a first processor architecture. The flash memory 200 stores a corresponding system BIOS block 206 adjacent the boot block 204. FIG. 2B illustrates a second flash memory 250, similar to flash memory 200, but having a reset vector 252 stored in boot block 254 that is compatible with a second processor architecture, different from the first processor architecture. The flash memory 250 also includes a corresponding system BIOS block 256 as well.

The flash memories 200 and 250 are conventional flash memories and incompatible with one another. In a conventional system, each would be employed in a different computer system.

The flash memories 200 and 250 may be preconfigured or programmed with a reset vector code that provides initial instructions to load the BIOS for the respective computing system. In some examples, the reset vector code passes control to a platform code within the boot block (not shown), which in turn provides instructions to determine the size of the recovery BIOS in flash memory, for example, to lock certain boot block segments. Each boot block may include a plurality of boot block segments that each execute a particular code as part of a boot process. The boot blocks 204 and 254 may include hardware locked boot block segments as well as ancillary boot block segments that store recovery BIOS for the computer system 100. The system BIOS blocks 206 and 256 may store main sections of the BIOS in a compressed, partially compressed, or uncompressed form.

Figure 3:
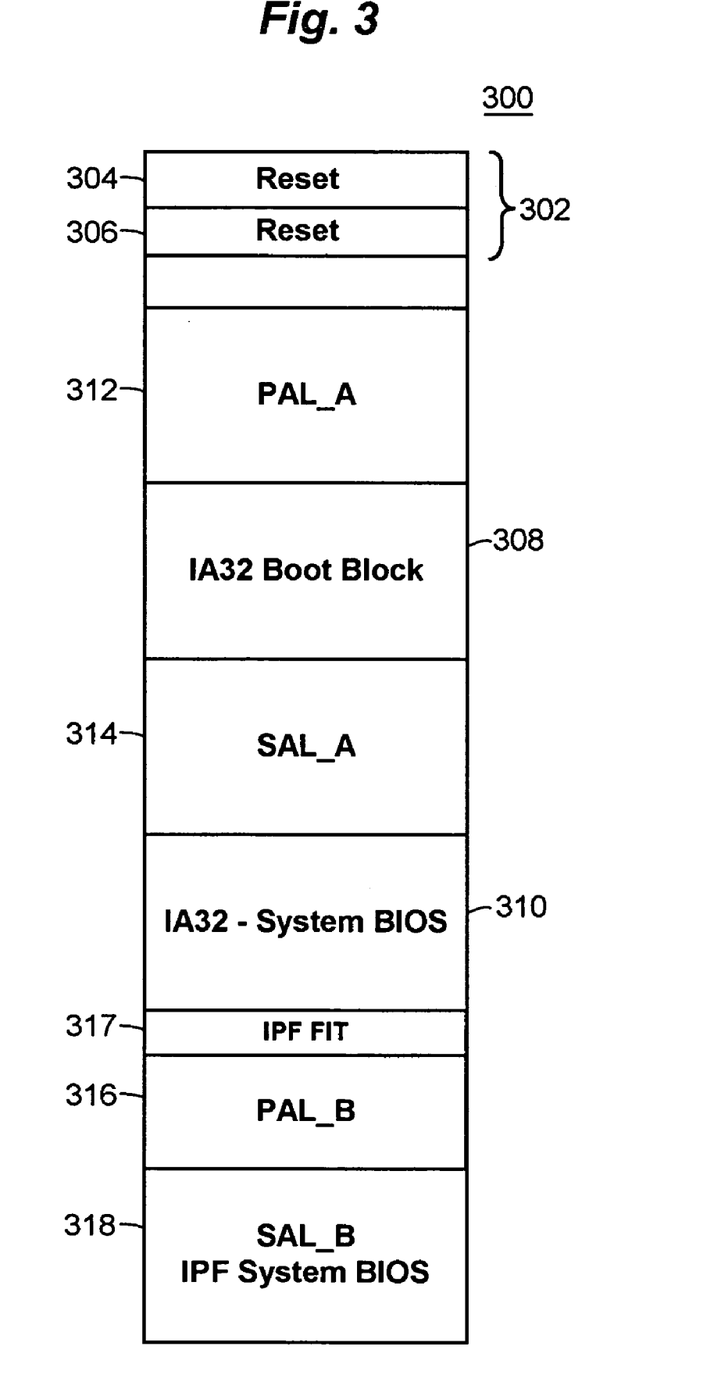
FIG. 3 illustrates an example block diagram of an interleaved boot block formed of dual boot blocks each compatible with an IA32 processor architecture and an IPF processor architecture, respectively.

By contrast, FIG. 3 illustrates an interleaved boot block compatible with multiple processor architectures, two in the illustrated example although any number of processor architectures is contemplated. As explained in additional detail, a flash memory including interleaved boot blocks may be used to execute a boot process from multiple boot processes, where the CPU architecture determines the particular boot process. The term interleaved as used herein includes storing various BIOS blocks or BIOS block components (that form a single BIOS block) in an alternating manner. For example, as described further below, the boot block and system BIOS block for two different BIOS processes may be stored in an alternating manner. Interleaving, however, is not limited to the illustrated examples and may be achieved in any manner to achieve a composite memory region in a flash memory for multiple processor support.

Boot block interleaving may be achieved through software build techniques. For example, limitations may be set on jumping within a flash memory through a combination of the build process and BIOS tables that describe the locations of various components. The build process, which may include creating executable binaries and tailoring those binaries into a single image, may instruct the BIOS process to avoid copying information to a particular portion of the flash memory, such as a portion dedicated to the storage of a boot block for another boot process, for example.

A flash memory 300 having an interleaved boot block and compatible with multiple processor architectures is shown in FIG. 3. The flash memory 300 includes boot blocks from two different processor architectures, i.e., IA32 and IPF architectures, in the illustrated example. The IA32 and IPF processor families execute codes of different word lengths and use upon BIOS boot processes that do not support one another.

The flash memory 300 of the illustrated example includes a reset region 302 that includes a first reset vector 304 for a first (e.g., an IA32) boot block and a second reset vector 306 for a second (e.g., an IPF) boot block. The memory locations for the reset vectors 304 and 306 may be hardwired into the CPUs for each corresponding processor architecture. That is, each CPU for a particular processor architecture may store the same reset vector memory address, such that upon system turn on the CPUs reset vector memory addressed is polled and accessed for BIOS initiation. Alternatively, the location of the reset vectors 304 or 306 may be stored elsewhere and accessible upon system turn on to direct the boot process to the appropriate BIOS boot block.

In the illustrated example, the reset vector 304 initiates an IA32 boot process by pointing to an IA32 boot block 308 that executes various boot block segments. The boot block 308 may store a pointer that points to an IA32 system BIOS block 310 that executes system BIOS functions before the computer system continues with the boot process by passing control to the rest of firmware. That is the IA32 boot process includes the execution of blocks 308 and 310.

In addition to the IA32 boot process blocks, 308 and 310, the flash memory 300 includes a boot block (in the form of various boot block components) and a system BIOS block compatible with an IPF processor architecture. These blocks may be stored along with the blocks of the IA32 boot process in an interleaved manner in the flash memory 300 to conserve memory space and execution time. With the flash memory 300, a computer system will be capable of executing both IA32 and IPF BIOSs.

In the illustrated example, the interleaving of the IA32 and IPF boot processes takes advantage of the IPF architecture firmware, which is different from the IA32 firmware and is designed around a modular architecture, partitioned into three major components. Processor Abstraction Layer (PAL) contains the code used to initially boot the processor and includes error recovery and processor self-test routines. System Abstraction Layer (SAL) abstracts chipsets and platform devices behind standardized software APIs (Application Program Interfaces) that help an operating system communicate with BIOS during the operating system boot phase. Extensible Firmware Interface (EFI) is a pre-boot environment, which is responsible primarily for booting operating systems.

Further, in some examples, such as the Intel® Itanium® 2 Architecture systems, SAL is used for bootstrap, system configuration, recovery, and error handling. The operating system or EFI can manipulate memory, PCI and chipset registers through SAL calls. The SAL provides a well-defined environment in which certain applications can be run and in which hardware devices can be completely initialized. Merely by way of example, some IPF systems may be compliant with the EFI 1.02 Specification, while others may be compliant with the EFI 1.10 Specification, both specifications available from Intel Corporation. In any event, the PAL, SAL and EFI modularization of the IPF boot process may be utilized to divide the conventional IPF boot block into interleavable modular boot block components.

For example, FIG. 3 shows a first IPF boot block component, PAL-A block 312, is stored in a first portion of the flash memory 300 adjacent the first boot block of the first processor architecture, the boot block 308. The PAL-A block 312 may store an address pointing to a second boot block component, SAL-A block 314 stored adjacent the system BIOS block 310. Further, the SAL-A block 314 may store a pointer to an additional boot block PAL-B 316 that executes boot block code before passing control to a system BIOS block 318 of the IPF boot process. The block 316 may access an IPF FIT (Firmware Interface Table) block 317 that stores the memory locations for various IPF BIOS components, including the IPF system BIOS block 318. Whereas the blocks 308 and 310 are associated with the IA32 boot process, the blocks 312, 314, 316, and 318 are associated with an IPF boot process.

In operation, the flash memory 300 is accessed upon turn on of the computer system, after which the processor architecture of the CPU in a common socket is identified, e.g., either an IA32 or an IPF processor architecture. Depending on the processor architecture, one of the two reset vectors 304 or 306 will be accessed by the stored reset vector memory location to execute the boot process compatible with the particular computer architecture.

Figure 4:
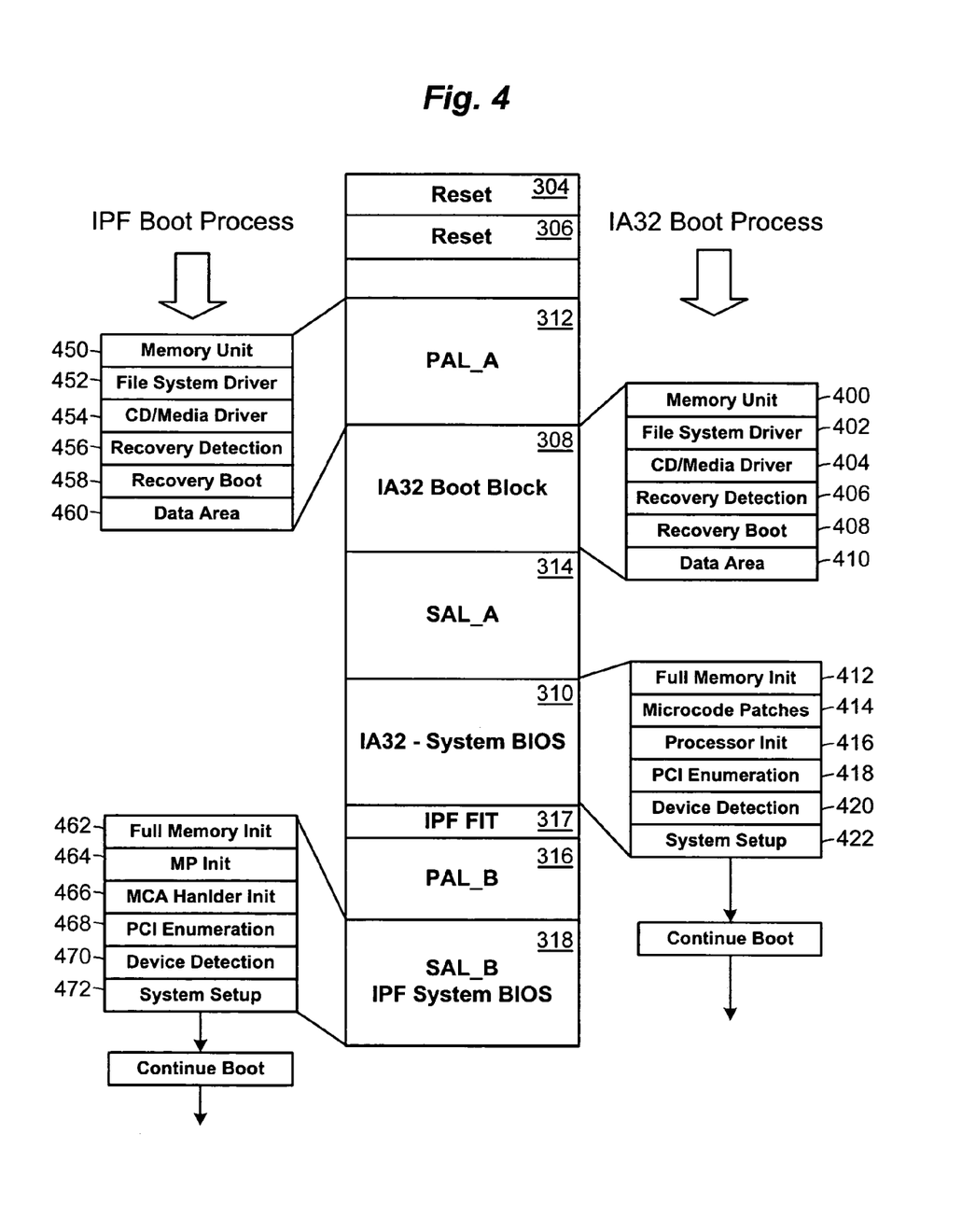
FIG. 4 illustrates the interleaved boot block of FIG. 3 but additionally showing an example execution of an IPF boot path showing various boot block segments and an IA32 boot path showing various boot block segments.

In reference to FIG. 4, during an IA32 boot process, the reset vector 304 may direct control to the boot block 308 where individual boot segments are executed. In the illustrated example, boot block 308 may include the following boot segments: a memory initialization boot segment 400; a file system driver boot segment 402, e.g., to access and initialize a storage medium containing the operating system; a floppy drive/CD-Rom drive driver boot segment 404, e.g., to access and initialize other storage media; a recovery detection boot segment 406; and a recovery boot segment 408. The boot block 308 may also include a data area 410. These boot segments are provided by way of example, not limitation.

After executing these boot segments control may be passed to the system BIOS block 310 that may include code segments for a full memory initialization 412, microcode patch execution 414, processor initialization 416, PCI enumeration 418, devices detection 420, and system setup 422. These code segments are provided by way of example, not limitation. In the illustrated example, after execution of the code segments, the system BIOS block 308 continues the boot process, for example, by passing control to the rest of firmware for among other things operating system initialization.

In contrast, during an IPF boot process, the reset vector 306 may be a PAL-A entry point that passes control to the PAL-A boot block 312 for execution of a PAL-A code that performs early processor initialization/preparation. The boot block 312 may pass control to the SAL-A boot block 314, whose address may be stored in the PAL-A block 312. The SAL-A block 314 may execute boot block segments for memory initialization 450, file system driver loading 452, and floppy drive/CD-Rom drive driver loading 454. The SAL-A boot block 314 may also include a recovery detection boot segment 456, a recovery boot segment 458, and a data area 460. These boot segments are provided by way of example, not limitation.

The SAL-A block 314 may pass control to the PAL-B boot block 316 stored at a location that may be pointed to by a memory location in the SAL-A block 314. The block 316 may authenticate and execute PAL-B code for the IPF architecture, prior to passing control to the system BIOS block 318. The system BIOS block 318 may include code segments to execute a full memory initialization 462, an MP (multi-processor) initialization 464, an MCA (machine check abort) handler unit 466 for error handling, a PCI enumeration 468, device detection 470, and system setup 472. These code segments are provided by way of example, not limitation. In the illustrated example, the system BIOS block 318 may pass control to the rest of the firmware to continue the boot process and initiate the operating system on the computer system.

The boot block segments and system BIOS block segments described above with reference to FIG. 4 are provided by way of example. Additional, fewer, or different segments than those described above may be used. Further, the segments may be stored for execution in a different order than that described. Further still, the segments may be executed in an order that is different from the order in which they are stored in the flash memory 300. Additionally, the boot block segments and system BIOS block segments are described with reference to IA32 and IPF architectures, however, the interleaving techniques are not limited to a particular type or number of processor architectures, or architectures. Nor are the techniques limited to particular processor families.

The interleaved boot block of a flash memory may not be prone to change, even after switching from one CPU architecture to another. These boot blocks may include code generally associated with accessing media, interpreting file systems, basic memory/chipset initialization and code to determine if recovery is required to be performed or not. Because such boot blocks typically do not need updating, they may be protected from alteration.

Figure 5:
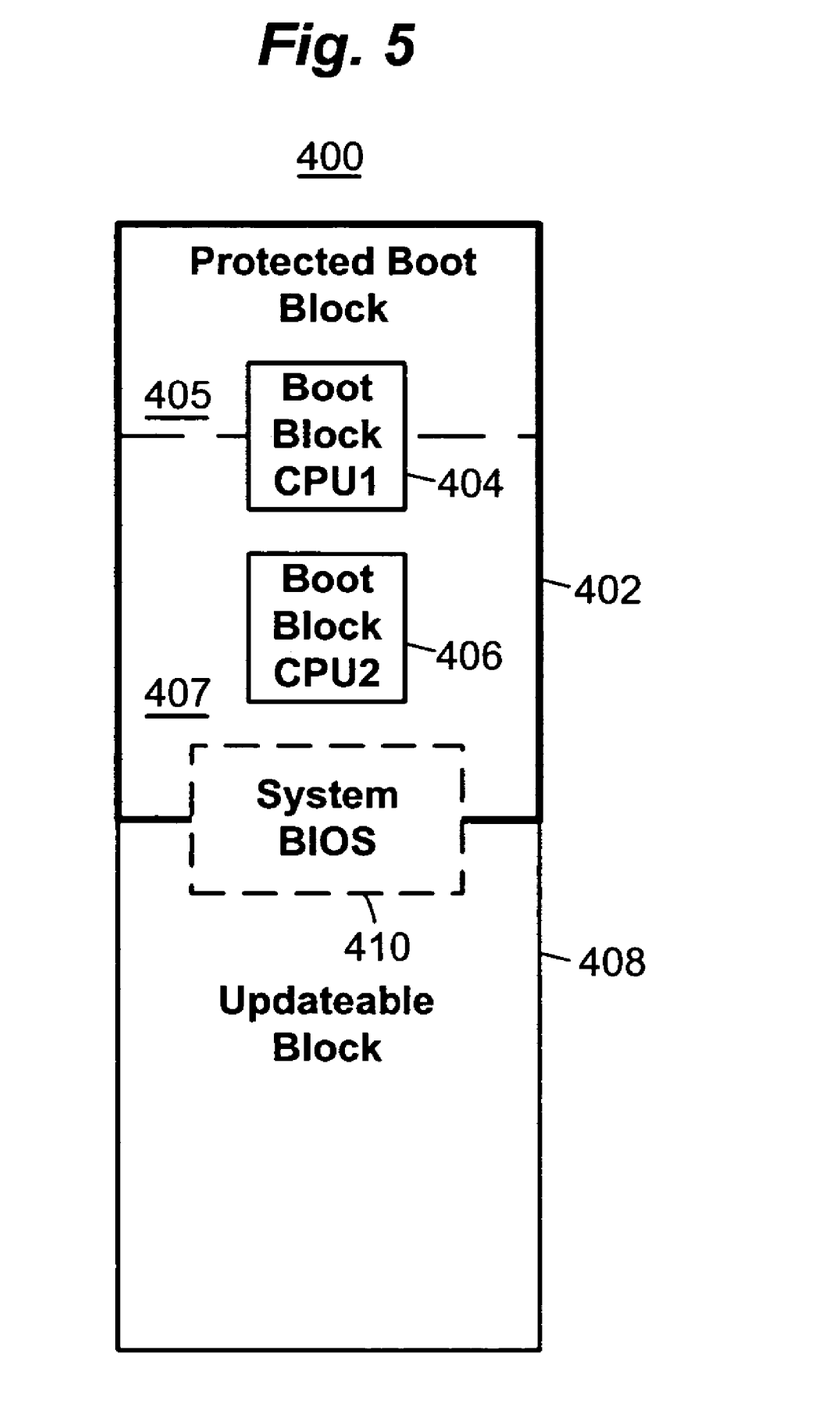
FIG. 5 illustrates an example block diagram of a flash memory having a locked, interleaved boot block memory region and an updatable memory region.

FIG. 5 illustrates an example flash memory 400 having an interleaved boot block 402 that has been locked to prevent alteration to either the first boot block 404 compatible with the first processor architecture or the second boot block 406 compatible with the second processor architecture. Either or both boot blocks 404 and 406 may be physically locked (i.e., hardware locked) or software locked within the flash memory 400. By way of example, not limitation, the first 64 kB of the flash memory 400 may be physically locked, while the remaining portions of the flash memory 400 may be software protected using virtual lock techniques, such as those described in "Method and System Using Virtual Lock For Boot Block Flash," U.S. Pat. No. 6,633,964, of Zimmer and Bulusu. The illustrated example shows a hardware locked portion 405 and a software locked portion 407.

In the illustrated example of FIG. 5, the protected boot block 402 is stored adjacent a non-protected, firmware block 408 that may be updated during system operation. This updatable block 408 may be updated to accommodate vendor updates, fault/recovery updates, as well as to accommodate any changes to the BIOS code that may result from a change from one CPU architecture to another. For example, the block 408 may contain processor architecture specific instructions for completing operating system and device initialization. In the illustrated example, a system BIOS 410 is shown having elements in both the protected boot block 402 and the updateable block 408. In any event, by having an updated boot block, the flash memory 400 need not have the full BIOS code for each possible boot process, but instead may have certain portions of the BIOS code, for example, non-recovery code, in a dynamic portion of the flash memory 400 that may be adjusted by the computer system.

The example of FIG. 5 shows a flash memory having a region containing interleaved BIOS code and a portion of non-interleaved BIOS code, where the former may be protected and the latter updateable. This partial interleaving is provided by way of example and not limitation. Alternatively, the entire BIOS, including the boot block, system BIOS, and remaining firmware blocks may be interleaved to include all components associated with different boot processes, as may be desired in systems where flash memory space is not a constraint, e.g., server applications. Where space is a constraint, however, it may be desirable to confine interleaving to the boot block portions only of a BIOS, for example, where recovery code resides. In this way, BIOS flash maps need not be made public, i.e., the IPF BIOS need not know of IA32 BIOS map and vice versa, which may add another layer of protection to prevent unauthorized accesses to critical BIOS areas.

Figure 6:
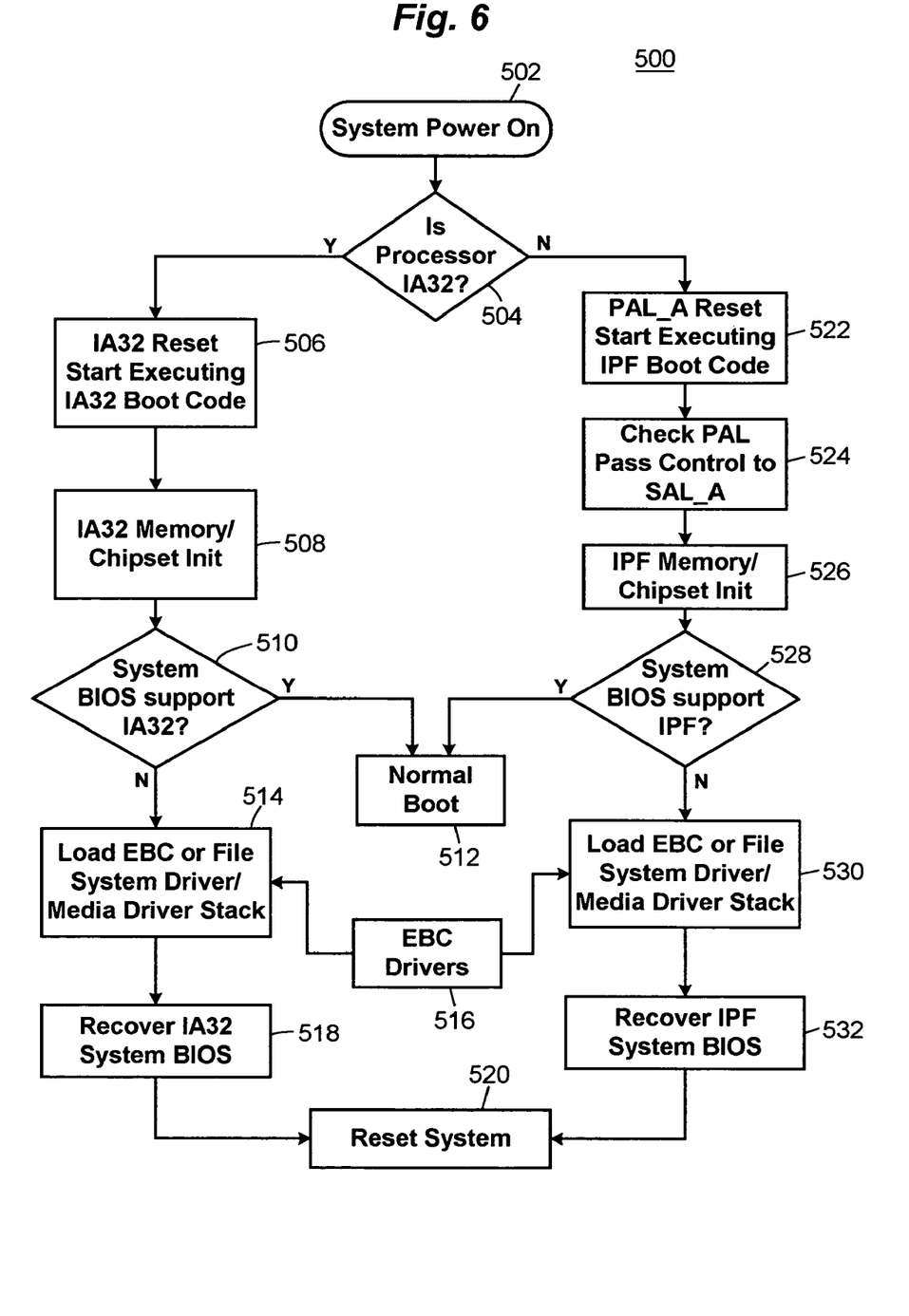
FIG. 6 illustrates an example flow diagram for recovering or updating system BIOS in a flash memory having an interleaved boot block.

To illustrate an example technique for updating an updatable portion of flash memory, FIG. 6 provides a process 500 that may be implemented on the computer system 100 to update an updatable portion of a flash memory. The process 500 may initiate upon powering on of the computer system, as indicated by block 502. The computer system may then determine if the CPU, in a common socket for example, is compatible with a first processor architecture (e.g., an IA32 processor architecture) at block 504. If the CPU is an IA32 processor, then a block 506 executes code to access a corresponding the reset vector of the flash memory, by way of example, memory address 0xFFFFFFF0. A block 508 executes IA32 compatible boot block code and a block 510 determines if the system BIOS of the flash memory, e.g., an updatable portion of the flash memory, supports the IA32 processor architecture. The block 510 may perform a component signature check, for example. If the flash memory does support the IA32 processor architecture, then control passes to a normal boot block 512. If the flash memory does not support the IA32 processor architecture, then a block 514 may execute code to load media drivers from block 516 so that the compatible BIOS code may be obtained. In the illustrated example, the computer system supports EBC, and the block 516 contains EBC drivers that may be shared by either than IA32 or IPF boot processes. The update with compatible BIOS code occurs at block 518, for example, by the computer system accessing a floppy disk or other storage medium that contains the compatible BIOS components and the block 518 storing those components in the updateable portion of the flash memory. Updates may be via any storage medium, however, including a floppy drive or other storage media, or a hard drive, ROM, RAM, or other memory as may be implemented in server applications. The computer system resets at block 520.

Returning to block 504, if it is determined that the CPU has a second processor architecture, then a block 522 may execute code to access the associated reset vector for a second boot process, for example, memory address 0xFFFFFFB0. A block 524 may execute a basic initialization and check under PAL-A and then pass control to a SAL-A entry point. A block 526 may perform memory and chipset initialization according to the IPF boot process. A block 528 determines whether the system BIOS of the flash memory, for example, the updatable portions of the flash memory, support the system BIOS of the IPF processor architecture. If they do, then a normal boot occurs at the block 512. If the flash memory does not support the IPF architecture, then a block 530 may execute code to load EBC drivers from the block 516. Recovery/updating occurs at block 532, in a similar manner to that described above with respect to block 514. The computer system may reset at the block 516.

The process 500 may be used to update or recover portions of a flash memory that are incompatible with the processor architecture of selected CPU. Such incompatibility may occur, for example, in some computer systems when a user changes from one processor architecture to another. For example, if the computer system contains an updated flash memory that only stores a system BIOS for the last used processor architecture and not a dual system BIOS, as in FIGS. 3 and 4, then while the interleaved boot block of a flash memory may support two architectures, each time the processor architecture is changed, the system BIOS block stored in the updated portion of the flash may be updated by a process like that of FIG. 6.

The process 500 is shown by way of example, not limitation. The order of execution of the blocks shown may be altered. Additionally, other boot block segments may be executed other than those described.

In addition to the optimization achieved via interleaved boot blocks, other optimization techniques may be implemented on a flash memory. For example, components of the BIOS may be compressed for storage in a flash memory, and a decompression module may be used to decompress these components upon BIOS execution. The system may compress components of each of the different, supported boot processes, or the system may compress only those components of a particular number of boot processes, such as only those components currently incompatible with the selected processor architecture.

In addition to compression techniques, interleaving may include storing shared BIOS components that may be executed during multiple boot processes. In this manner, interleaving involves fully combining executables for shared use. For example, as discussed with reference to FIG. 6, if the computer system support EBC in BIOS, then EBC binaries may be created that are compatible with both IA32 and IPF boot processes. The EBC code is created in a build process and then an interpreter may be used by the particular boot process to convert that code for use with the selected processor architecture. In this way, the total flash memory used to store the interleaved boot blocks may be reduced.

For example, with a modular firmware technology such as the Intel Platform Innovation Framework for the Extensible Firmware Interface (the specification of which is available from Intel Corporation), a computer system may have a common socket and common chipset that are compatible with different processor architectures. A set of common drivers written in the EBC may be shared between boot processes, to allow IA32 processors to execute in either IA32 or EM64T mode (i.e., a 64 bit extension for the IA32 processor) while an IPF processor is allowed to run in native physical mode, while sharing byte-code drivers for the algorithmically complex portions of initialization (e.g., PCI enumeration, boot device selection, and other EBC driver procedures). For example, once boot block code of the interleaved boot block is launched, various BIOS modules may be shared across both IA32 and IPF boot procedures, for example by using a shared EBC interpreter to execute EBC code to load a CD-Rom driver, hard drive driver or other drivers that can be shared across architectures. The entry point path may be different, but the EBC interpreter allows for the sharing of various drivers, where the each shared driver is compatible with the chipset on the computer system.

Figure 7A:
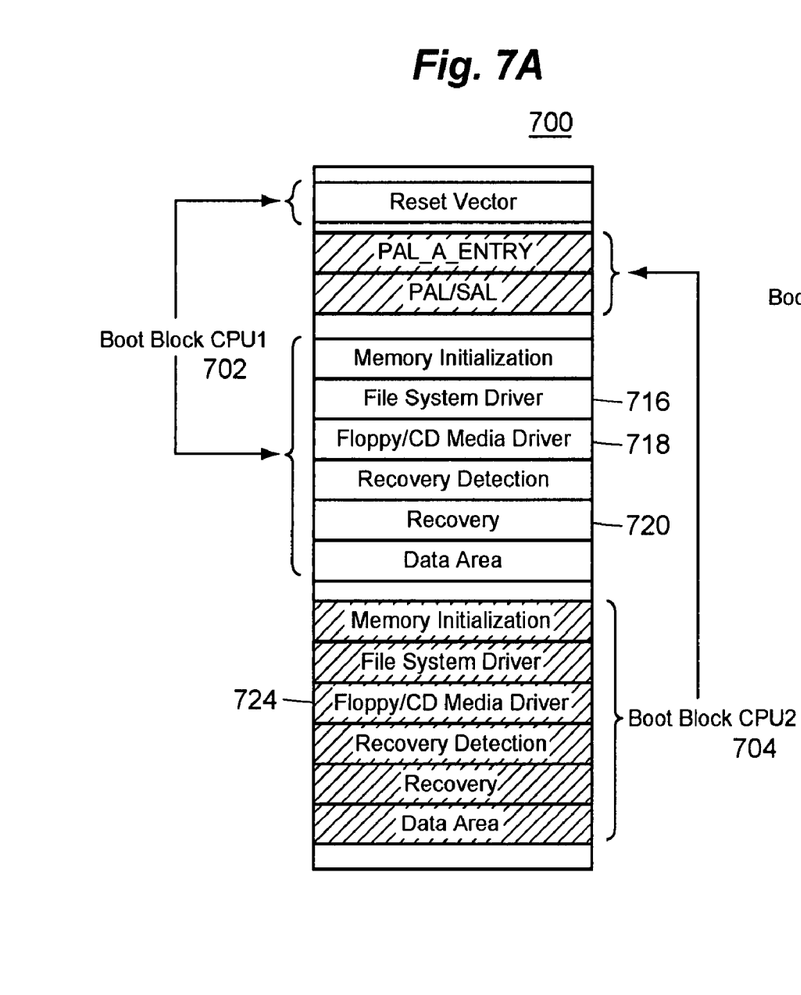
FIG. 7A illustrates an example block diagram of a flash memory having interleaved boot block segments in accordance with an example.
Figure 7B:
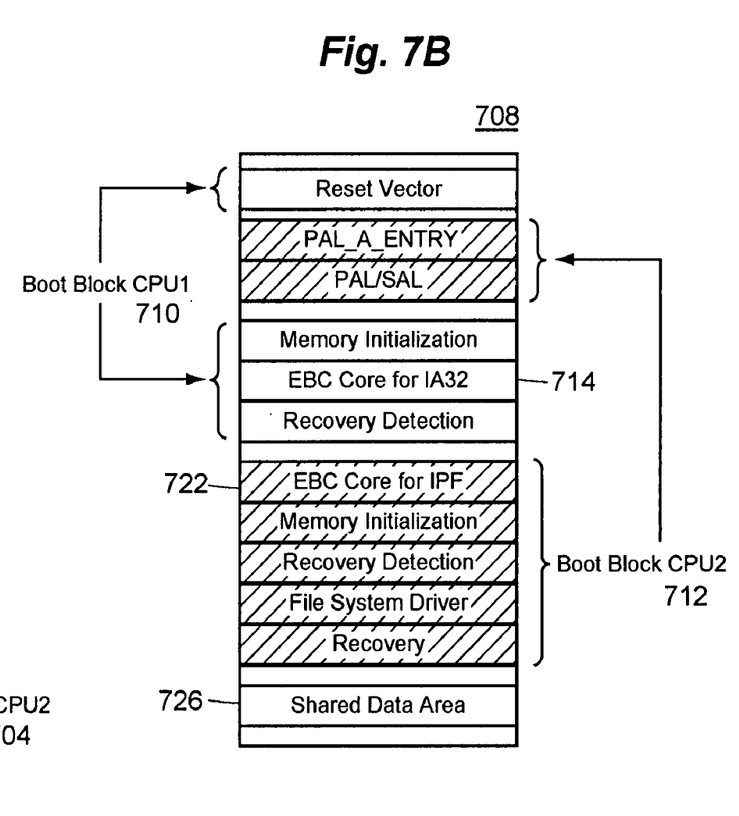
FIG. 7B illustrates a flash memory having similar boot block segments to FIG. 7A, but optimized using drivers shared by different boot processes.

FIG. 7A shows an example of a first interleaved boot block 700 that is not optimized for EBC sharing, and that includes all of the boot block segments for each of two boot blocks, an IA32 boot block 702 and an IPF boot block 704. FIG. 7B shows an example of a second interleaved boot block 708 that includes a first boot block 710 for an IA32 boot process and a second boot block 712 for an IPF boot process. The boot block 710 now includes an EBC core 714 that accesses the file system driver and floppy drive driver/CD Rom media driver previously accessed by boot block segments 716, 718 of FIG. 7A. The block 714 may also perform the recovery of block 720. The boot block 712 includes an EBC core 722 that may access the floppy drive driver/CD Rom media driver previously accessed by block segment 724 of FIG. 7A. The EBC cores 714 and 722 represent executions of shared EBC code, e.g., EBC drivers, stored in the shared data area 726, which is accessible by both the boot block 710 and the boot block 712.

The boot blocks 700 and 708 are shown by way of example. Any BIOS module can be compiled as EBC so that it can be shared across IA32 and IPF platforms.

The techniques described are not limited to a particular computer system environment. They may be used on common socket or other systems that allow for multiple processor architecture boot ups. They may be used on personal computer, sever, or enterprise level systems, by way of example, and not limitation. Furthermore, examples are described with reference to two rather specific processor architectures, the IA32 and IPF processor architecture families, which differ in instruction set and instruction set execution, for example, the former being a single instruction execution system and the latter a bundled instruction execution system. These differences are by way of example, not limitation. The multiple processor architectures may differ in other ways instead or in addition. Further still, although examples of interleaving boot block or firmware components are provided for two different processor architectures, interleaving may occur to support additional processor architectures. For example, a flash memory may have three or more interleaved processor-specific boot block components. Further, such interleaving may be limited to only a particular number of processor architectures. For example, in systems supporting three or more processor architectures, a predominant processor architecture may be stored in a normal contiguous portion of flash memory, while two, less dominant, but also supported processor architectures may be interleaved. Of course, these variations are given by way of example. Numerous variations will be known to persons skilled in the art and will be known to fall within scope of the claims to follow.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What we claim is:

1. A flash memory device comprising:
    a plurality of boot process components;
    a first subset of the plurality of boot process components associated with a first processor architecture;
    a second subset of the plurality of boot process components associated with a second processor architecture different than the first processor architecture; and
    wherein components of the first subset are interleaved with components of the second subset such that components from each of the first subset and the second subset are stored in the flash memory device in an alternating manner.

2. The flash memory device of claim 1, wherein the first processor architecture is an IA32 processor architecture and wherein the second processor architecture is an IPF processor architecture.

3. The flash memory device of claim 1, wherein the first subset comprises at least a first basic input/output system (BIOS) boot block and the second subset comprises at least a second BIOS boot block.

4. The flash memory device of claim 3, wherein the at least one second BIOS boot block is an EFI-compatible boot block.

5. The flash memory device of claim 3, wherein the first subset further comprises a first BIOS block and the second subset comprises a second BIOS block.

6. The flash memory device of claim 3, further comprising a reset region having a first reset vector for identifying the first BIOS boot block and a second reset vector for identifying the second BIOS boot block.

7. The flash memory device of claim 3, further comprising a protected boot block region comprising at least a portion of the first BIOS boot block and at least a portion of the second BIOS boot block.

8. The flash memory device of claim 7, wherein the protected boot block region includes a hardware protected portion and a software protected portion.

9. The flash memory device of claim 7, further comprising an updatable BIOS region, having a first state compatible with the first processor architecture and a second state compatible with the second processor architecture.

10. The flash memory device of claim 3, further comprising a first system BIOS compatible with the first processor architecture and a second system BIOS compatible with the second processor architecture.

11. The flash memory device of claim 3, further comprising a shared boot block compatible with the first BIOS boot block and the second BIOS boot block.

12. The flash memory device of claim 1, wherein components from each of the first subset and the second subset are stored in the flash memory in an alternating manner such that no component associated with the first processor architecture is adjacent to an other component associated the first processor architecture and no component associated with the second processor architecture is adjacent to an other component associated with the second process architecture.

13. A computing system comprising:
    a flash memory having a first plurality of boot process components compatible with a first processor architecture and a second plurality of boot process components compatible with a second processor architecture, where the first processor architecture is different than the second processor architecture;
    a processor compatible with the first processor architecture or the second processor architecture to selectively execute the first plurality of boot process components or the second plurality of boot process components; and
    wherein components of the first plurality are interleaved with components of the second plurality such that components from each of the first plurality and the second plurality are stored in the flash memory in an alternating manner.

14. The computing system of claim 13, wherein the first plurality comprises at least a first BIOS boot block and the second plurality comprises at least a second BIOS boot block.

15. The computing system of claim 14, wherein the flash memory comprises a reset region having a first reset vector for identifying the first BIOS boot block and a second reset vector for identifying the second BIOS boot block.

16. The computing system of claim 14, wherein the flash memory further comprises a protected boot block region comprising at least a portion of the first BIOS boot block and at least a portion of the second BIOS boot block.

17. The computing system of claim 16, wherein the flash memory further comprises an updatable BIOS region, having a first state compatible with the first processor architecture and a second state compatible with the second processor architecture.

18. The computing system of claim 14, further comprising a shared boot block compatible with the first BIOS boot block and the second BIOS boot block.

19. An article comprising a machine-accessible medium having stored thereon instructions that, when executed by a machine, cause the machine to:
    identify a processor architecture between at least a first processor architecture and a second processor architecture;
    access a flash memory having a first plurality of boot process components associated with the first processor architecture and a second plurality of boot process components associated with the second processor architecture, wherein the first architecture is different than the second architecture;
    in response to the identification of the processor architecture, selectively execute the first plurality of boot process components or the second plurality of boot process components; and
    wherein components of the first plurality are interleaved with components of the second plurality such that components frome ach of the first plurality and the second plurality are stored in the flash memory in an alternating manner.

20. The article of claim 19, wherein the machine has a flash memory having a protected region and an updatable region having a first state in the first processor architecture and a second state in the second processor architecture, the article having further instructions that, when executed by the machine, cause the machine to execute a boot block component stored in the protected region.

21. The article of claim 20, having further instructions that, when executed by the machine, cause the machine to update the updatable region from the first processor architecture to the second processor architecture.

22. The machine-accessible medium of claim 19, wherein the first plurality comprises at least a first BIOS boot block and the second plurality comprises at least a second BIOS boot block.

23. The article of claim 22, having further instructions that, when executed by the machine, cause the machine to:
in response to the identification of the processor architecture as the first processor architecture, execute the first BIOS boot block; and
in response to the identification of the processor architecture as the second processor architecture, execute the second BIOS boot block.

24. A method for executing a boot sequence from a flash memory comprising:
storing in a flash memory a first plurality of boot process components compatible with a first processor architecture and a second plurality of boot process components compatible with a second processor architecture different than the first processor architecture, components of the first plurality being interleaved with components of the second plurality such that components from each of the first plurality and the second plurality are stored in the flash memory in an alternating manner;
identifying a processor architecture from between at least the first processor architecture and the second processor architecture;
executing the first plurality of boot process components if the processor architecture is identified as the first processor architecture; and
executing the second plurality of boot process components if the processor architecture is identified as the second processor architecture.

25. The method of claim 24, wherein the first plurality comprises at least a first BIOS boot block and the second plurality comprises at least a second BIOS boot block.

26. The method of claim 25, further comprising:
accessing a first reset vector of the first BIOS boot block, if the processor architecture is the first processor architecture; and
accessing a second reset vector of the second BIOS boot block, if the processor architecture is the second processor architecture.

27. The method of claim 25, further comprising storing at least a portion of the first BIOS boot block or the second BIOS boot block in a protected region of the flash memory.

28. The method of claim 24, further comprising storing at least a portion of a system BIOS in an updatable region of the flash memory.

29. A method of recovering a system basic input/output system (BIOS) for a computer system having a processor, the method comprising:
determining a processor architecture of the processor;
accessing a flash memory having a first plurality of boot process components compatible with a first processor architecture and a second plurality of boot process components compatible with a second processor architecture different than the first processor architecture, wherein the first plurality is associated with a first system BIOS and the second plurality is associated with a second system BIOS and wherein components of the first plurality are interleaved with components of the second plurality such that components from each of the first plurality and the second plurality are stored in the flash memory in an alternating manner;
identifying a current system BIOS as either the first system BIOS or the second system BIOS;
determining if the current system BIOS is compatible with the processor architecture; and
in response to determining that the current system BIOS is incompatible with the processor architecture, updating the current system BIOS to a compatible system BIOS.

30. The method of claim 29, further comprising in response to a determination that the current system BIOS is not compatible with the processor architecture, loading a shared driver for allowing access to a system BIOS recovery medium.

31. The method of claim 30, wherein the shared driver is compatible with the first processor architecture and the second processor architecture.

32. The method of claim 29, wherein updating the current system BIOS comprises:
loading a file system;
loading a media driver; and
accessing a compatible system BIOS stored on a storage medium of the media driver.

33. The method of claim 29, wherein the first plurality comprises at least a first boot block and the second plurality comprises at least a second boot block.

34. The method of claim 33, further comprising in response to the determination of the processor architecture, selectively executing either the first boot block or the second boot block.

* * * * *